Figure 1:
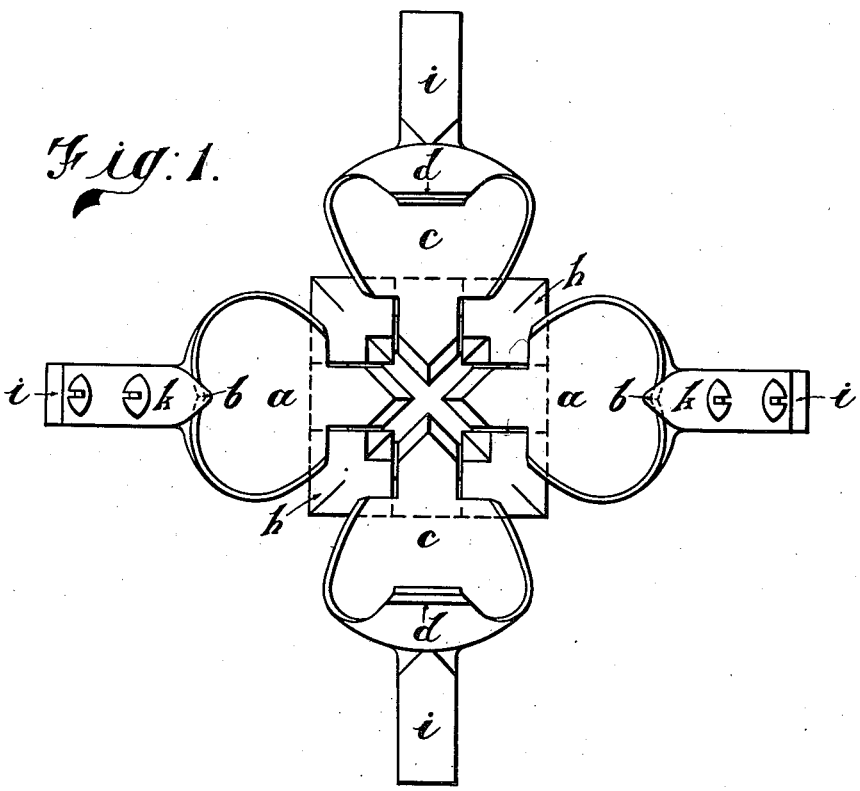

Sept. 11, 1923.

A. LAWTON 1,467,438

APPARATUS FOR THE MANUFACTURE OF HOLLOW INDIA RUBBER BALLS

Filed June 8, 1922     2 Sheets-Sheet 1

Inventor.
Alfred Lawton,
by Herbert W. T. Jenner,
Attorney.

Sept. 11, 1923. 1,467,438
A. LAWTON
APPARATUS FOR THE MANUFACTURE OF HOLLOW INDIA RUBBER BALLS
Filed June 8, 1922 2 Sheets-Sheet 2

Inventor
Alfred Lawton
by Herbert W. Jenner,
Attorney.

Patented Sept. 11, 1923.

1,467,438

UNITED STATES PATENT OFFICE.

ALFRED LAWTON, OF MANCHESTER, ENGLAND.

APPARATUS FOR THE MANUFACTURE OF HOLLOW INDIA-RUBBER BALLS.

Application filed June 8, 1922. Serial No. 566,749.

*To all whom it may concern:*

Be it known that I, ALFRED LAWTON, a subject of the King of Great Britain and Ireland, and resident of Manchester, in the county of Lancaster, England, have invented certain Improvements in and in Apparatus for the Manufacture of Hollow India-Rubber Balls, of which the following is a specification.

This invention relates to improvements in and in apparatus for the manufacture of hollow balls, bulbs and like inflatable articles from india rubber and similar material, and so far as the apparatus is concerned has reference to that type referred to in British Patent No. 13235 of 1897, the objects of my invention being to provide an improved construction of ball, bulb or like inflatable article, and improvements in the apparatus by which such articles are manufactured.

In the specification of the aforesaid patent an apparatus is described for making a hollow india rubber ball or the like from a flat sheet of plastic rubber which is suitably bent, shaped and the excess material cut away by the aforesaid apparatus. The essential feature of such apparatus comprises four petal shaped plates, or plates which are substantially quarter hollow spheres, suitably hinged at their lower ends so that the plates may be opened out and the flat sheet of rubber placed between them after which by means of lever and link mechanism, the plates are closed so as to bend the rubber sheet upwardly, cut off the surplus material or corners of the sheet and at the same time join up the edges of the sheet which have been cut to make air tight joints, after which the partially-formed ball is removed from the machine and vulcanized in the known way. The plates referred to each come to a point at the upper end, the sides making a sharp acute angle whilst the cut rubber sheet substantially corresponds to the shape of the plates along the junction lines. It therefore follows that unless the pointed ends of the cut rubber sheet become properly stuck together that air may escape at the point of junction. In order to prevent this it has been found necessary in manufacture to place a short plastic rubber plug between the points of the plates just as they are closing, this plug providing material for ensuring a proper joint being made where the sectional points of the rubber join. This rubber plug projects inside the ball but its outer end is usually completely cleared away at the time that the petal-shaped plates completely close. I have found it is desirable to do away with the rubber plug, firstly because its insertion in the apparatus between the plates is a somewhat dangerous operation owing to the liability of the operator's fingers being cut by the plates as they are closing and secondly because it is found that there is also a tendency for the plug to pull away somewhat from the inner surface of the ball during vulcanization and so disturb the joint and sometimes distort the ball out of shape or again form a somewhat rough finish at the outside of the ball.

My invention consists in so constructing the petal-shaped plates as to form a ball, bulb or like inflatable article with an improved and properly-sealed joint particularly at the point where the plates meet at their upper ends and further consists in means for holding the rubber or like sheet in position within the upper ends of the petal-shaped plates and prevent it protruding as the latter are being closed to form the joints and cut off the surplus material.

My invention will be fully described with reference to the accompanying drawing which by way of example shows apparatus, designed particularly for the production of hollow india rubber or like balls, in which—

Figure 2:
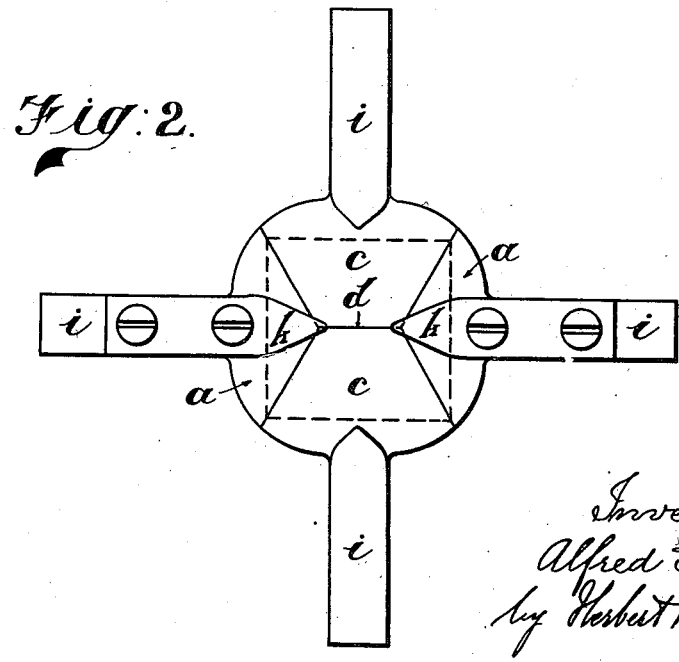
Figure 3:
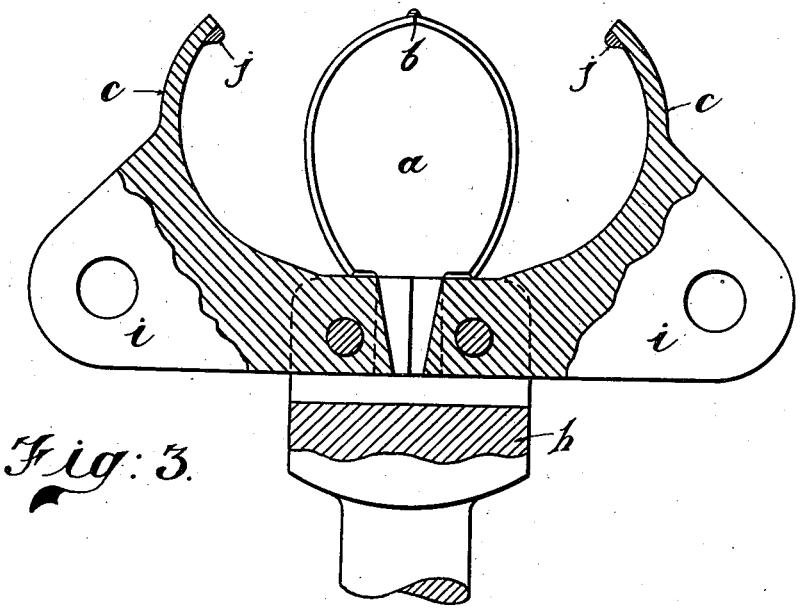
Figure 4:
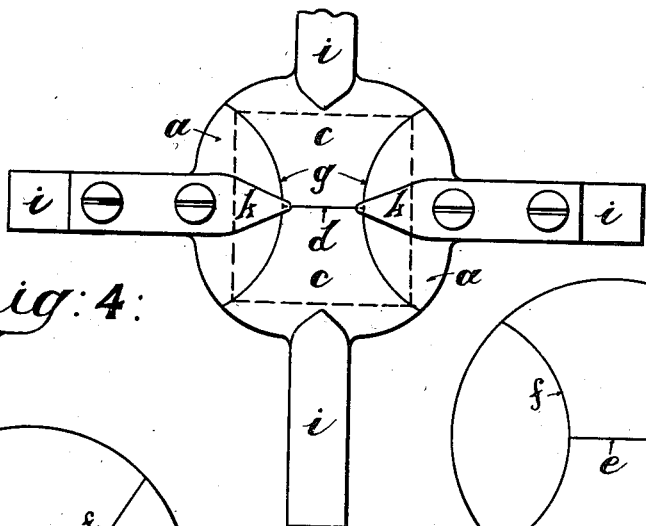
Figure 5:
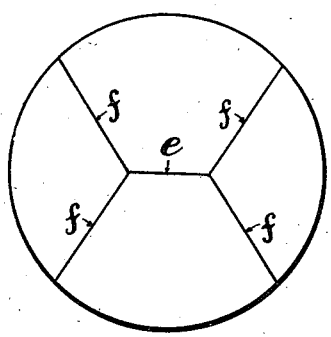
Figure 6:
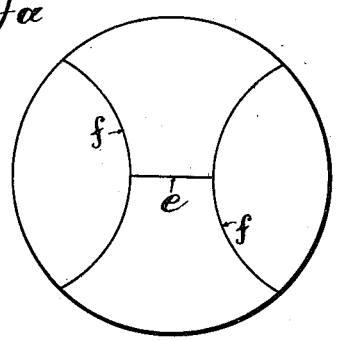

Fig. 1, is a plan of the petal-shaped plates in open position and the block to which they are pivoted;

Fig. 2, plan showing the plates closed;

Fig. 3, sectional elevation of the plates in open position;

Fig. 4, plan of a modified form of the plates shown in the foregoing figures, and Figs. 5 and 6 plan of inflated balls produced by the devices illustrated in Figs. 1 to 3 and Fig. 4, respectively showing the lines on which the joints of the rubber sheet are made.

In carrying out my invention the foregoing defects are eliminated in one modification of apparatus constructed in acordance with my invention by making two of the petal-shaped plates *a* (Figs. 1 and 3) somewhat smaller than usual for a given size of ball so that their points *b* do not meet at the centre when closed and by making the other two plates *o* somewhat larger than usual and doing away with their pointed ends so as to leave flat meeting edges *d* in line with the points of the first two plates *a* when the whole of the four plates are closed, as in Fig. 2. We therefore obtain a central joint $e$ in the ball (Fig. 5) having a comparatively long surface which allows the rubber material to be sealed at the edges and at the junction of such edges with the longitudinal joints $f$ in a perfectly straight manner without using a separate rubber plug to assist in making the joint.

In a second modification Fig. 4 the upper edges $g$ of two of the petal-shaped plates $a$ are curved instead of being pointed and when closed leave a considerable space between their extreme edges. In conjunction with two plates $a$ so formed we employ two other plates $c$ at right angles to them, the edges of which are curved to correspond with those of the first two but to leave a comparatively long straight joint $d$ as before where they meet.

The petal-shaped plates are pivoted at their lower ends to a block $h$ in the known way and are moved about the pivots by links coupled to ears $i$ and to slides (not shown) such slides being connected to the operating lever also in the known way.

The foregoing construction of petal-shaped plates make admirable joints in the ball structure at the places referred to but to doubly ensure the effectiveness of such joints we may form transverse ribs $j$ on the inside of plates $c$ near to the flat meeting edges $d$ to assist in holding the rubber sheet in position as the four plates are being closed or to prevent it creeping through the joint at the meeting edges $d$ of plates $c$. These ribs also assist in compressing the rubber somewhat as the plates are closed, thus consolidating the joint.

As a further means of ensuring perfect joints in the rubber material, particularly at the junctions of the joint $e$ with the longitudinal joints $f$ we fix on the ears $i$ pointed spurs or plates $k$, the points of which project over the aforesaid junctions when the plates are being closed so preventing undue escape of rubber at these points.

Motor horn bulbs and bulbs for syringes could have their outer bulbous portion made and sealed in the manner described. So also would other inflatable articles capable of being dealt with in apparatus of the type described.

The arrangements of petal-shaped plates referred to give an improved construction of ball, bulb or like articles having stronger joints and without the necessity of employing a rubber plug to assist in making the central joint.

What I claim as my invention and desire to secure by Letters Patent is:—

1. In a ball making machine, four petal-shaped plates arranged in pairs and pivotally connected together at one end, the plates of one pair being longer than the plates of the other pair and being provided with transversely arranged ends which meet together and form a joint when the plates are closed.

2. A ball making machine as set forth in claim 1, the petal-shaped plates being formed with curved interlocking side edges.

3. A ball making machine as set forth in claim 1, the longer petal-shaped plates being provided with ribs on their inner faces adjacent to their said transversely arranged ends.

4. A ball making machine as set forth in claim 1, the shorter petal-shaped plates being provided with spurs which overlap the end portions of the joint between the said transversely arranged edges of the longer plates when the plates are closed.

In testimony whereof I have hereunto set my hand.

ALFRED LAWTON.